US012504939B2

(12) United States Patent
Jeon et al.

(10) Patent No.: US 12,504,939 B2
(45) Date of Patent: Dec. 23, 2025

(54) DISPLAY DEVICE AND CONTROL METHOD FOR SAME

(71) Applicant: SAMSUNG ELECTRONICS CO., LTD., Suwon-si (KR)

(72) Inventors: Byungjeong Jeon, Suwon-si (KR); Hayeon Yoo, Suwon-si (KR); Ahyeon Shim, Suwon-si (KR); Woonghee Lee, Suwon-si (KR); Younga Kim, Suwon-si (KR); Jibum Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 18/219,466

(22) Filed: Jul. 7, 2023

(65) Prior Publication Data
US 2023/0350627 A1 Nov. 2, 2023

Related U.S. Application Data

(63) Continuation of application No. PCT/KR2021/004512, filed on Apr. 9, 2021.

(30) Foreign Application Priority Data

Jan. 8, 2021 (KR) .......................... 10-2021-0002843

(51) Int. Cl.
*G06F 3/048* (2013.01)
*G06F 3/0482* (2013.01)
(Continued)

(52) U.S. Cl.
CPC .......... *G06F 3/1454* (2013.01); *G06F 3/0482* (2013.01); *H04N 21/4316* (2013.01);
(Continued)

(58) Field of Classification Search
None
See application file for complete search history.

(56) References Cited

U.S. PATENT DOCUMENTS 6,857,131 B1   2/2005   Yagawa et al.
9,628,744 B2   4/2017   Phang et al.
(Continued)

FOREIGN PATENT DOCUMENTS

JP        3814903 B2      8/2006
KR    10-0690353 B1      3/2007
(Continued)

OTHER PUBLICATIONS

International Search Report (PCT/ISA/210) issued by the International Searching Authority on Sep. 14, 2021 in International Application No. PCT/KR2021/004512.
(Continued)

*Primary Examiner* — Thanh T Vu
(74) *Attorney, Agent, or Firm* — Sughrue Mion, PLLC

(57) ABSTRACT

A display device and a control method thereof are provided. The display device a display and at least one processor which controls the display to display first content; based on a multi-view execution command being input, determines at least one piece of content for providing a multi-view screen, the at least one piece of content being determined based on a context in which a multi-view execution command is input; displays, on the display, a list including the at least one piece of content; and displays the multi-view screen including first content and second content, wherein the second content is selected from among the at least one piece of content included in the list according to a user command. The first content may be provided by a first external device connected through of a first interface, and the second content may be provided by a second external device connected
(Continued)

through of a second interface that is different from the first interface.

20 Claims, 20 Drawing Sheets

(51) Int. Cl.
*G06F 3/14* (2006.01)
*H04N 21/431* (2011.01)
*H04N 21/4722* (2011.01)
*H04N 21/482* (2011.01)
*G09G 5/14* (2006.01)

(52) U.S. Cl.
CPC ....... *H04N 21/4722* (2013.01); *H04N 21/482* (2013.01); *G06F 2203/04803* (2013.01); *G09G 5/14* (2013.01)

(56) References Cited

U.S. PATENT DOCUMENTS

| | | | |
|---|---|---|---|
| 9,860,474 | B2 | 1/2018 | Park et al. |
| 9,928,020 | B2 | 3/2018 | Jang |
| 10,725,732 | B2 * | 7/2020 | Oh ..................... G06F 3/0482 |
| 2014/0337773 | A1 | 11/2014 | Phang et al. |
| 2016/0249006 | A1 * | 8/2016 | Park ................. H04N 21/42204 |
| 2017/0142484 | A1 | 5/2017 | Jeon et al. |
| 2017/0237931 | A1 * | 8/2017 | Lee ..................... H04N 21/4122 348/565 |
| 2017/0332116 | A1 * | 11/2017 | Lee ..................... H04N 21/431 |
| 2020/0125243 | A1 * | 4/2020 | Feng ..................... G06F 3/0483 |
| 2020/0236411 | A1 | 7/2020 | Lee |
| 2020/0413150 | A1 * | 12/2020 | Kang .................. H04N 21/482 |

FOREIGN PATENT DOCUMENTS

| | | |
|---|---|---|
| KR | 10-2012-0104648 A | 9/2012 |
| KR | 10-2013-0043747 A | 5/2013 |
| KR | 10-2014-0133353 A1 | 11/2014 |
| KR | 10-2014-0133363 A | 11/2014 |
| KR | 10-2014-0144029 A | 12/2014 |
| KR | 10-2015-0121915 A | 10/2015 |
| KR | 10-2015-0122035 A | 10/2015 |
| KR | 10-2015-0136314 A | 12/2015 |
| KR | 10-2016-0084202 A | 7/2016 |
| KR | 10-2019-0066402 A | 6/2019 |

OTHER PUBLICATIONS

Written Opinion (PCT/ISA/237) issued by the International Searching Authority on Sep. 14, 2021 in International Application No. PCT/KR2021/004512.

Communication issued on Dec. 6, 2024 by the Korean Intellectual Property Office in Korean Patent Application No. 10-2021-0002843.

* cited by examiner

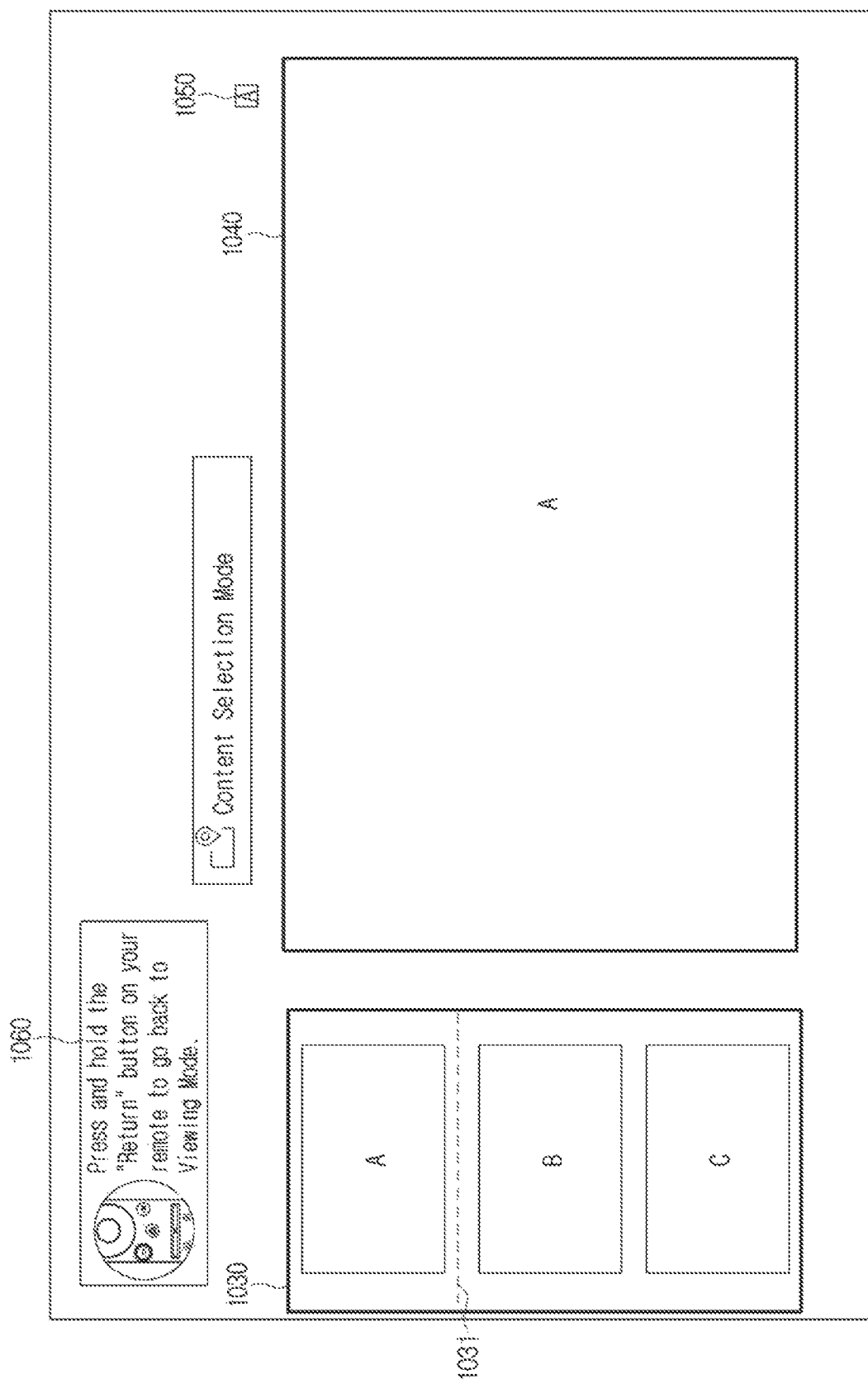

DISPLAY DEVICE AND CONTROL METHOD FOR SAME

CROSS-REFERENCE TO RELATED APPLICATIONS

This application is a bypass continuation of International Application No. PCT/KR2021/004512, filed on Apr. 9, 2021, which is based on and claims priority to Korean Patent Application No. 10-2021-0002843, filed on Jan. 8, 2021, the disclosures of which are incorporated by reference herein in their entireties.

BACKGROUND

1. Field

The disclosure relates to a display device and a control method for the same, and more particularly, to a display device that can provide a multi-view screen, and a control method for the same.

2. Description of Related Art

Recently, a display device providing a multi-view screen consisting of a plurality of contents has been developed.

However, such a display device may only provide a plurality of contents provided by one source device (e.g., a set-top box) with a multi-view screen, and thus there may be a problem that the display device cannot satisfy a user's need for viewing a plurality of contents provided by various source devices through a multi-view screen.

Also, display devices provided a multi-view screen including a plurality of contents based on a plurality of channels selected according to a user input.

This may cause an inconvenience of having to select a plurality of contents for providing a multi-view screen one by one through channel conversion (or, channel selection) to a user.

SUMMARY

Provided are a display device that can provide a plurality of contents provided by various source devices through a multi-view screen, and may provide a multi-view screen that fits a user need quickly by providing recommended contents and/or a combination of recommended contents for constituting the multi-view screen to the user, and a control method for the same.

According to an aspect of the disclosure, a display device includes: a display; and at least one processor configured to: control the display to display a first content on the display, determine, based on a multi-view execution command being input, at least one content for providing a multi-view screen based on a context in which the multi-view execution command was input, control the display to display a list including the at least one content on the display, and control the display to display the multi-view screen including the first content, and a second content, selected according to a user command, among the at least one content included in the list on the display, wherein the first content is provided by a first external device connected through a first interface, and wherein the second content is provided by a second external device connected through a second interface that is different from the first interface.

The at least one processor may be further configured to: based on the multi-view execution command being input, determine a type of the first content that is being displayed through the display, and determine the at least one content for providing the multi-view screen based on the type of the first content.

The at least one processor may be further configured to: control the display to, based on the first content being a content of an exercise type, display the list including the second content of the exercise type on the display, and based on the second content of the exercise type included in the list being selected according to the user command, execute an application for providing the second content, receive a signal corresponding to the second content from the second external device based on the execution of the application, and display the multi-view screen including the second content on the display based on the received signal.

The at least one processor may be further configured to: control the display to, based on the first content being a content of an information provision type, display the list including the second content of the information provision type on the display, and based on the second content included in the list being selected according to the user command, execute an application for providing the second content, receive a signal corresponding to the second content from the second external device based on the execution of the application, and control the display to display the multi-view screen including the second content providing different information from the first content on the display based on the received signal.

The at least one processor may be further configured to: control the display to, based on the first content being a content of a type of providing an image without a sound, display the list including the second content providing a sound on the display, and based on the second content included in the list being selected according to the user command, execute an application for providing the second content, receive a signal corresponding to the second content from the second external device based on the execution of the application, and control the display to display the multi-view screen including the second content providing a sound on the display based on the received signal.

The at least one processor may be further configured to: based on a user command for selecting a mirroring content among the at least one content included in the list, receive image data for mirroring from the second external device through the second interface, and control the display to display the multi-view screen including a content that is being displayed on the second external device on the display based on the image data.

The at least one processor may be further configured to: based on the multi-view execution command being input, determine the second content provided at a time when the multi-view execution command was input based on content use history information, and control the display to display the list including the second content on the display.

The second content includes an image provided through a camera connected to the second interface.

The at least one processor may be further configured to: based on a user command for selecting a content among a plurality of contents included in the multi-view screen, control the display to display the plurality of contents in a first area, control the display to display a screen for control of the content selected according to the user command in a second area, and perform control of the selected content based on a user command input into the second area.

The at least one processor may be further configured to: based on the context in which the multi-view execution command was input, determine a plurality of contents for providing the multi-view screen, control the display to display the list including a user interface (UI) corresponding to a combination of the plurality of contents, and control the display to display the multi-view screen including the plurality of contents on the display based on a user command for selecting the UI.

According to an aspect of the disclosure, a control method of a display device includes: displaying a first content on a display of the display device; determining, based on a multi-view execution command being input, at least one content for providing a multi-view screen based on a context in which the multi-view execution command was input; displaying, on the display, a list including the at least one content; and displaying, on the display, the multi-view screen including the first content, and a second content, selected according to a user command, among the at least one content included in the list, wherein the first content is provided by a first external device connected through a first interface, and wherein the second content is provided by a second external device connected through a second interface that is different from the first interface.

The determining the at least one content may include: based on the multi-view execution command being input, determining a type of the first content that is being displayed, and determining the at least one content for providing the multi-view screen based on the type of the first content.

The controlling to display the list may include: controlling to display, based on the first content being a content of an exercise type, the list including the second content of the exercise type, and wherein the controlling to display the multi-view screen may include: based on the second content of the exercise type included in the list being selected according to the user command, executing an application for providing the second content, receiving a signal corresponding to the second content from the second external device based on the execution of the application, and controlling to display the multi-view screen including the second content based on the received signal.

The controlling to display the list may include: based on the first content being a content of an information provision type, controlling to display the list including the second content of the information provision type, and wherein the controlling to display the multi-view screen may include: based on the second content included in the list being selected according to the user command, executing an application for providing the second content, receiving a signal corresponding to the second content from the second external device based on execution of the application, and controlling to display the multi-view screen including the second content providing different information from the first content based on the received signal.

The controlling to display the list may include: controlling to display, based on the first content being a content of a type of providing an image without a sound, the list including the second content providing a sound, and wherein the controlling to display the multi-view screen may include: based on the second content included in the list being selected according to the user command, executing an application for providing the second content, receiving a signal corresponding to the second content from the second external device based on execution of the application, and controlling to display the multi-view screen including the second content providing a sound based on the received signal.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10B is a diagram for illustrating a screen for controlling one of a plurality of contents included in a multi-view screen, according to an embodiment of the disclosure;

DETAILED DESCRIPTION

For terms used in this specification and the claims, general terms were selected in consideration of the functions described in the disclosure. However, the terms may vary depending on the intention of those skilled in the art, legal or technical interpretation, and emergence of new technologies, etc. Also, there are some terms that were arbitrarily designated by the applicant, and the meaning of such terms may be interpreted as defined in this specification. Terms that are not specifically defined in the disclosure may be interpreted based on the overall content of this specification and common technical knowledge in the pertinent art.

Also, in describing the disclosure, in case it is determined that detailed explanation of related known functions or components may unnecessarily confuse the gist of the disclosure, the detailed explanation will be abridged or omitted.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in detail with reference to the accompanying drawings.

Figure 1:
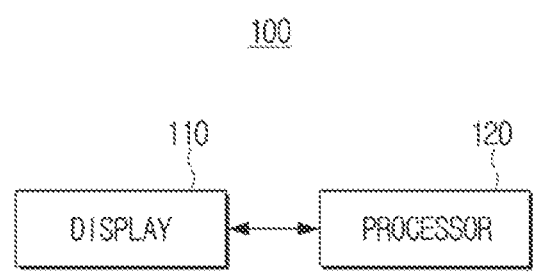
FIG. 1 is a block diagram for illustrating a display device, according to an embodiment of the disclosure.

FIG. 1 is a block diagram for illustrating a display device according to an embodiment of the disclosure.

The display device 100 according to an embodiment of the disclosure is a device that can provide a multi-view screen including a plurality of contents, and for example, the display device 100 may be implemented as various display devices such as a television (TV), a smart TV, signage, a desktop personal computer (PC), a laptop computer, a smartphone, a tablet PC, etc.

Referring to FIG. 1, the display device 100 according to an embodiment of the disclosure may include a display 110 and a processor 120.

The display 110 may display various contents. Here, a content is a concept including at least one of a still image or a moving image, and the display 110 may display various contents such as a broadcasting content, a multimedia content, an advertising content, etc. Also, the display 110 may display various kinds of user interfaces (UIs) and icons.

In particular, the display 110 may display a multi-view screen including a plurality of contents. Here, the plurality of contents constituting the multi-view screen may not only be contents provided by the same external device (or, source device), but they may also be contents provided by different external devices. As an example, the multi-view screen may not only include a plurality of contents of different channels provided by a set-top box, but it may also include a plurality of contents provided by different external devices such as a content provided by a set-top box, a content provided by an IoT camera, a content mirrored by an external device (e.g., a mobile device, a PC, etc.), or a content provided by an application server, etc. Also, the size and the location of each content constituting the multi-view screen may be set or changed in various ways based on the number of the contents included in the multi-view screen.

Such a display 110 may be implemented as displays in various forms such as a liquid crystal display (LCD) panel, light emitting diodes (LED), organic light emitting diodes (OLED), liquid crystal on silicon (LCoS), digital light processing (DLP), etc. Also, inside the display 110, driving circuits that may be implemented in forms such as an a-Si TFT, a low temperature poly silicon (LTPS) TFT, an organic TFT (OTFT), etc., a backlight unit, etc. may also be included.

In addition, the display 110 may be combined with a touch detector, and implemented as a touch screen.

The processor 120 controls the overall operations of the display device 100. For this, the processor 120 may include at least one of a central processing unit (CPU), an application processor (AP), or a communication processor (CP).

The processor 120 may control hardware or software components connected to the processor 120 by driving an operating system or an application program, and perform various kinds of data processing and operations. Also, the processor 120 may load commands or data received from at least one of other components on a volatile memory and process them, and store various data in a non-volatile memory.

The processor 120 may receive a user command for executing a multi-view function (referred to as a multi-view execution command hereinafter).

Figure 2A:
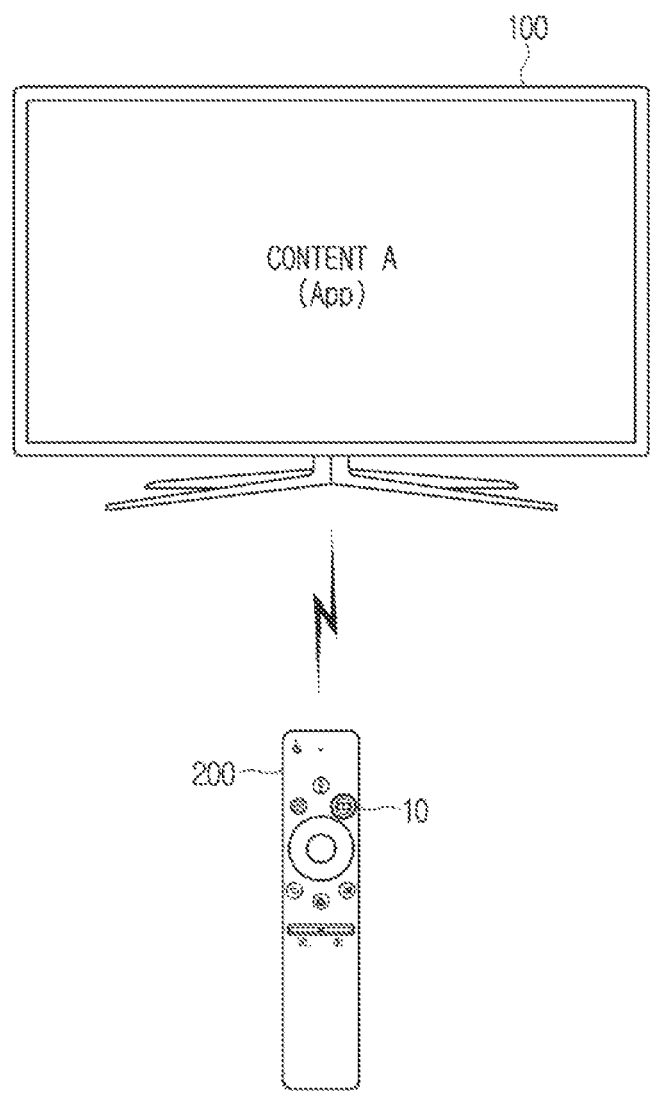
FIG. 2A is a diagram for illustrating an embodiment of inputting a multi-view execution command, according to an embodiment of the disclosure.

Here, the multi-view execution command may be a user command for pushing a multi-view function button 10 provided on a remote control device 200, as illustrated in FIG. 2A. In this case, the processor 120 may receive a signal for executing the multi-view function from the remote control device 200, and execute the multi-view function based on the signal received from the remote control device 200. However, this is merely an example, and the multi-view execution command may be a user voice input through a microphone provided on the remote control device 200 or the display device 100, or it may be a user gesture input into a sensor (e.g., a camera, etc.) of the display device 100. Also, the multi-view execution command may be a user command of selecting a menu for executing the multi-view function displayed on the display device 100. Here, the menu may not only be selected based on direction keys and a selection button of the remote control device 200, but it may also be selected through a user input of touching a key (e.g., a jog switch) or the display 110 implemented as a touch screen provided on the display device 100.

When the multi-view execution command is input, the processor 120 may determine at least one content for constitution of the multi-view screen.

Specifically, based on the context in which the multi-view execution command was input, the processor 120 may determine at least one content for constituting the multi-view screen.

Here, the context is a concept including the situation of the time point when the multi-view execution command was input, and as an example, if the multi-view execution command is input in a situation wherein a content A is displayed on the display 110, the processor 120 may determine a plurality of contents for constituting the multi-view screen based on the content A.

For this, when the multi-view execution command is input, the processor 120 may determine the type of the content A that is being displayed through the display 110. Here, the content A may be a content received from a first external device (e.g., an application server providing the content A) through a first interface (e.g., a Wi-Fi communication interface).

Specifically, the processor 120 may determine the type of the content A based on metadata of the content A. For this, the processor 120 may perform data analysis (or, parsing) of the content A. However, this is merely an example, and the processor 120 may also determine the type of the content A through various methods such as image analysis or sound analysis, etc.

As an example, the processor 120 may determine the content A as a content of an exercise type (or, a content of a home training type) based on the metadata of the content A. In this case, the processor 120 may determine at least one other content of the exercise type based on the content A of the exercise type. Here, the at least one other content of the exercise type may be a content received from a second external device (e.g., a USB camera) through a second interface (e.g., a USB interface) different from the first interface.

For this, the memory of the display device 100 may store information for a plurality of contents corresponding to a plurality of content types. As an example, the memory may store a content provided by a USB camera as a content corresponding to contents of the exercise type.

Figure 2B:
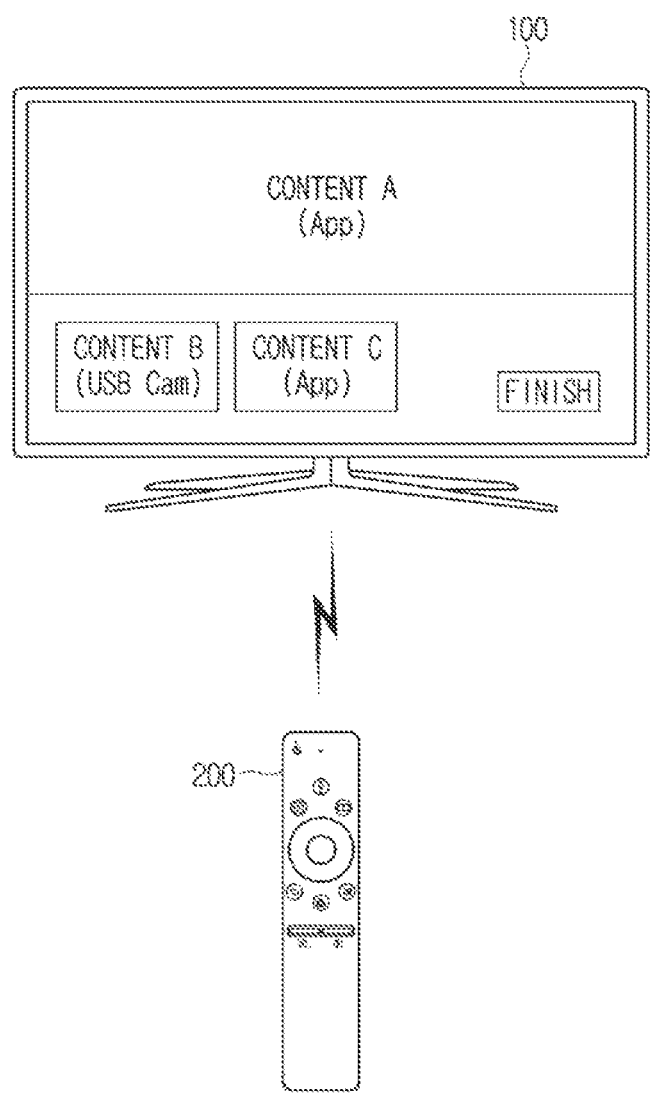
FIG. 2B is a diagram for illustrating a list, according to an embodiment of the FIG. 2C is a diagram for illustrating an embodiment of selecting a content included in a list, according to an embodiment of the disclosure.

When at least one content for constituting the multi-view screen is determined, the processor 120 may display a list including the determined at least one content on the display 110. As an example, if a multi-view execution command is input while the content A of the exercise type received from the first external device through the first external interface is displayed on the display 110 as described above, the processor 120 may display a list including a content B provided by the USB camera which is the second external device through the second interface on the display 110. Specifically, as illustrated in FIG. 2A, if a multi-view function execution command is input while the content A is displayed in the entire areas of the display 110, the processor 120 may display the content A that was being displayed through the entire areas of the display 110 in the first area of the display 110, and display a list including at least one content for constituting the multi-view screen in the second area of the display 110, as illustrated in FIG. 2B. In the above, the content B was suggested as an example as a content for constituting the multi-view screen, but depending on embodiments, additional contents other than the content B may be further included as a content for constituting the multi-view screen. In this case, as illustrated in FIG. 2B, in the list, not only the content B, but also various contents such as a content C, etc. may be further included as content related to the content A.

Figure 2C:
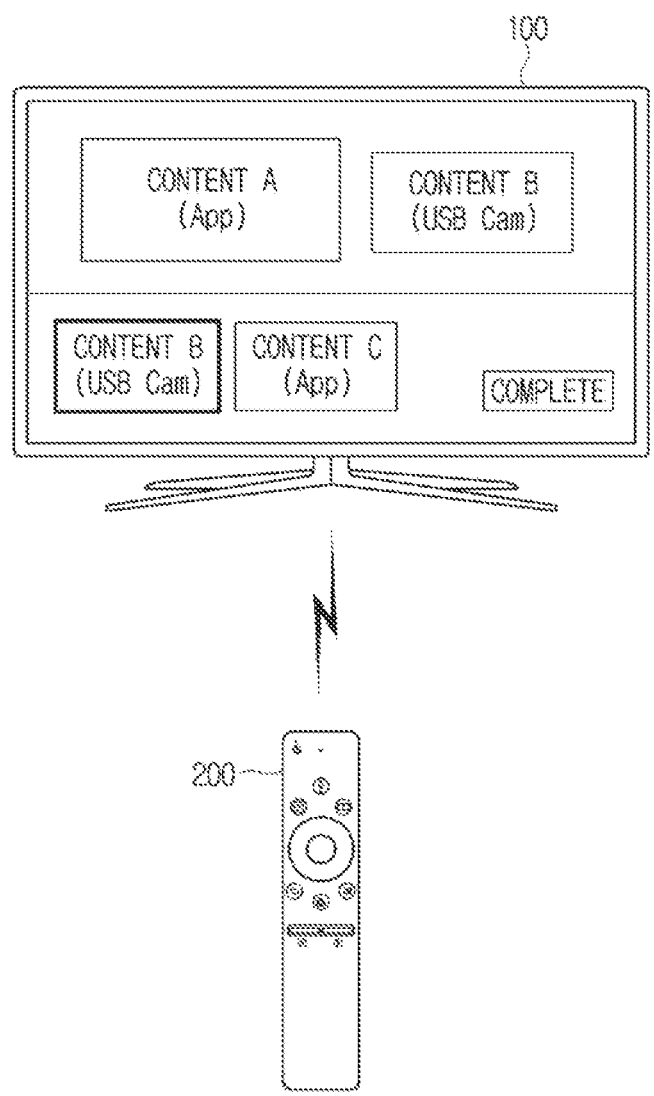
FIG. 2D is a diagram for illustrating an embodiment of finishing constitution of a multi-view screen, according to an embodiment of the disclosure.
FIG. 2E is a diagram illustrating a multi-view screen, according to an embodiment of the disclosure.
FIG. 2F is a diagram for illustrating an embodiment of providing a combination of recommended contents, according to an embodiment of the disclosure.
FIG. 2G is a diagram illustrating a multi-view screen, according to an embodiment of the disclosure.

The processor 120 may receive a user command selecting one or a plurality of contents among the at least one content included in the list. Here, the user command may be a user command for pushing a direction key button and a check button provided on the remote control device 200. Referring to FIG. 2C, in case a direction key button provided on the remote control device 200 is selected, the processor 120 may display an indicator on at least one content included in the list based on the signal received from the remote control device 200. Then, in case the check button provided on the remote control device 200 is pushed afterwards, the processor 120 may execute an application corresponding to the content on which the indicator is displayed (i.e., an application or a program for providing the content) based on the signal received from the remote control device 200, and display a multi-view screen including the content acquired based on execution of the application in one area of the display 110. For example, in case the content B provided by the USB camera is selected as in FIG. 2C, the processor 120 may execute an application (e.g., an application for control of the USB camera) for providing the content B, and control the USB camera to perform photographing. Then, the processor 120 may receive a signal corresponding to the content B photographed by the USB camera from the USB camera, and display a multi-view screen including the content B in one area of the display 110 based on the received signal.

However, this is merely an example, and a user command for selection of a content may be a user voice input through a microphone provided on the remote control device 200 or the display device 100, or it may be a user gesture input into a sensor (e.g., a camera, etc.) of the display device 100. Also, a user command for selection of a content may be received by manipulation of a switch (e.g., a jog switch) provided on the display device 100 or a user input of touching the display 110 implemented as a touch screen.

Figure 2D:
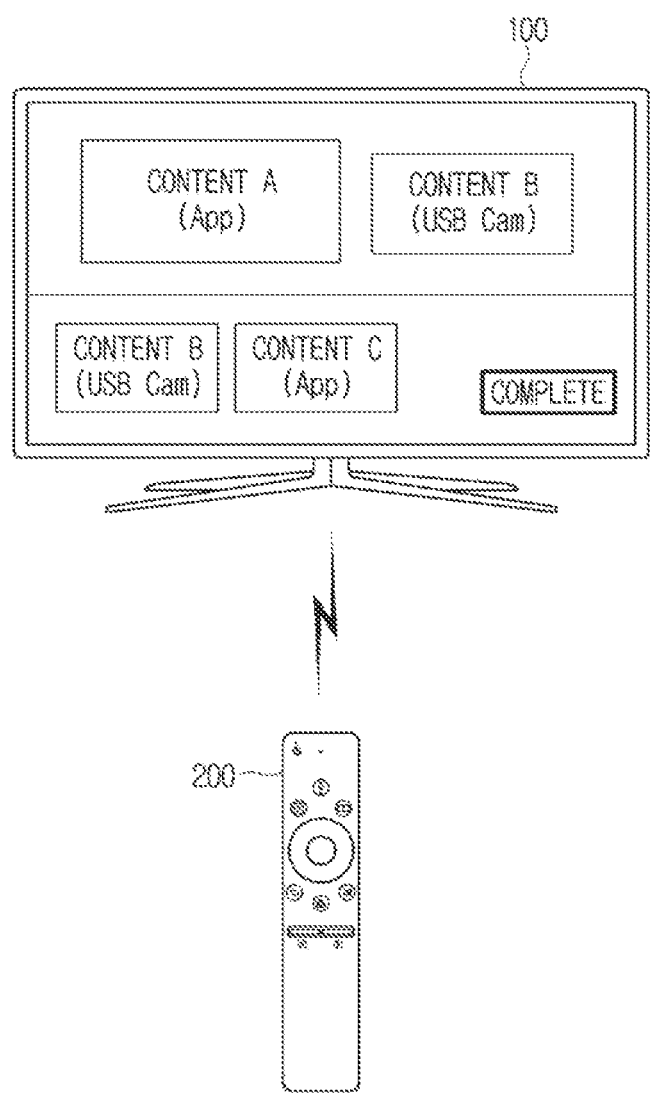
Figure 2E:
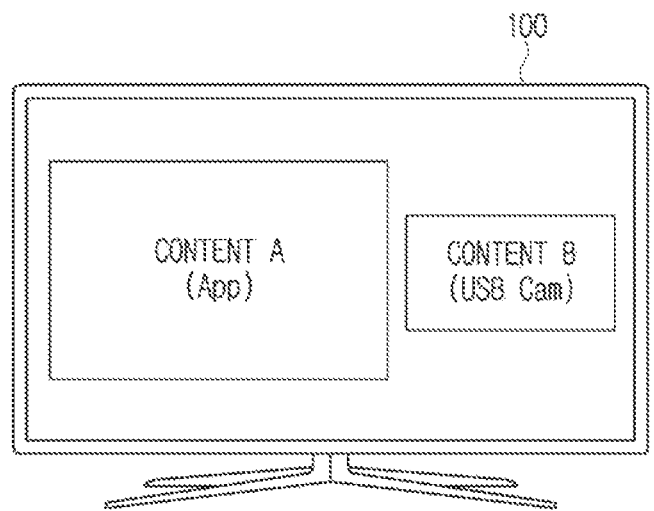

Afterwards, when a user command for finishing the constitution of the multi-view screen is input, the processor 120 may display the multi-view screen including the content A, and the content selected according to the user command (e.g., the content B) among the at least one content included in the list on the display 110 as in FIG. 2E. Here, the user command for finishing the constitution of the multi-view screen may be, for example, a user command selecting the finish menu displayed on the display as in FIG. 2D. However, this is merely an example, and the user command for finishing the constitution of the multi-view screen may be a user command selecting a button (e.g., a return button) provided on the remote control device 200, and in this case, the display may not display the finish menu as in FIG. 2D.

Accordingly, the user can do exercise while comparing the exercise posture of the trainer through the content A (e.g., an execution screen of an exercise application) and the user's own exercise posture through the content B (e.g., a screen provided by the USB camera).

As described above, in the disclosure, a plurality of contents provided by various source devices can be provided through a multi-view screen. Also, recommended contents for constituting a multi-view screen are provided to a user based on the context in which the multi-view function was executed, and accordingly, a multi-view screen that fits the user need can be provided quickly.

In the above, an embodiment in case one content (e.g., the content B) is selected in the list was described, but depending on embodiments, a plurality of contents (e.g., the content B and the content C) may be selected. In this case, the processor 120 may provide a multi-view screen including the content A, the content B, and the content C.

Also, according to an embodiment of the disclosure, the processor 120 may provide a combination of recommended contents for constituting a multi-view screen.

Figure 2F:
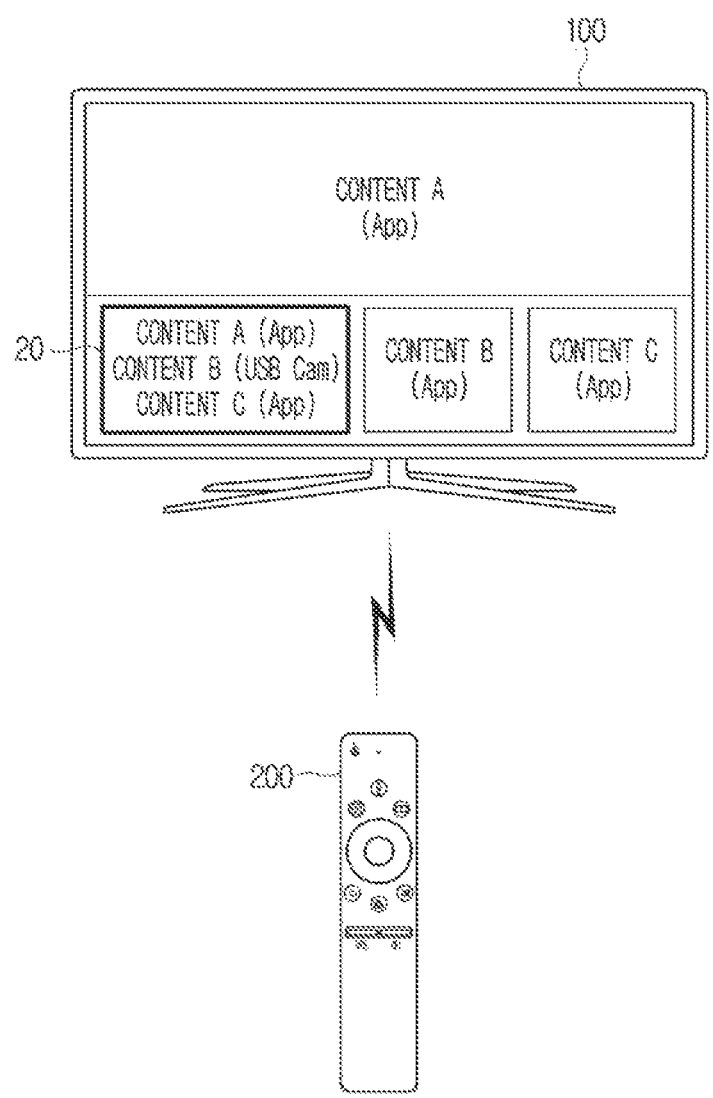
Figure 2G:
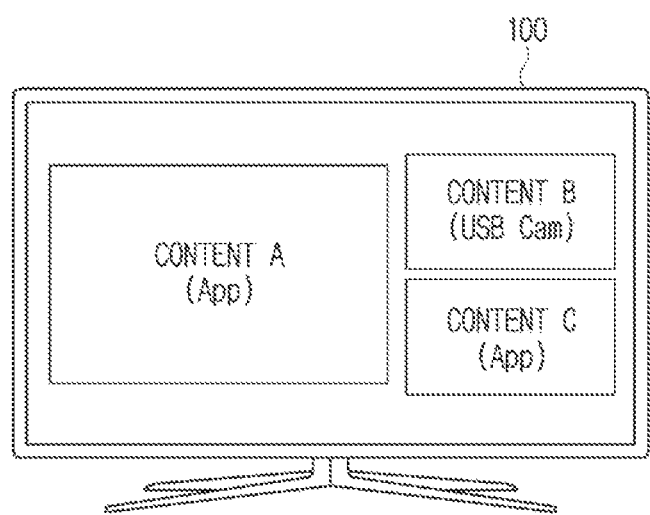

As an example, as described above, in case the content A, the content B, and the content C are determined as contents for constituting a multi-view screen, the processor 120 may display a UI 20 for providing a multi-view screen including the content A, the content B, and the content C on the list, as in FIG. 2F. Then, when a user command selecting the UI 20 is input, the processor 120 may display a multi-view screen including the content A, the content B, and the content C on the display 110, as in FIG. 2G. Accordingly, the user can be provided with a multi-view screen that fits the context in which the multi-view function was executed more quickly.

Also, in the disclosure, not only a list including at least one recommended content as in FIG. 2B, or a list including at least one recommended content and a combination of at least one recommended content as in FIG. 2F can be provided, but also a list including a plurality of combinations of recommended contents can be provided. As an example, in case a combination of the content A, the content B, and the content C, and a combination of a content X, a content Y, and a content Z are determined as contents for constituting a multi-view screen based on the context in which a multi-view function execution command was input, the processor 120 may display a list including a first UI for providing a multi-view screen including the content A, the content B, and the content C, and a second UI for providing a multi-view screen including the content X, the content Y, and the content Z. Here, the combination of the content X, the content Y, and the content Z is an example, and the combination can be determined based on content use history information, and explanation in this regard will be described later with reference to FIG. 7.

In the above, a multi-view screen consisting of a plurality of contents provided by different external devices was described, but this is merely an example, and the disclosure can also provide a multi-view screen consisting of a plurality of contents provided by the same external device.

As an example, while the content A provided by an external device (e.g., a set-top box) is displayed on the display 110, if a multi-view execution command is input, the processor 120 may determine the type of the content A, and determine at least one content for constituting a multi-view screen among a plurality of contents provided by the set-top box based on the type of the content A. For example, in case the content A is a content of a sport type such as a baseball game, the processor 120 may determine at least one other baseball content B provided by the set-top box, and display a list including the determined baseball content B. Then, when the baseball content B included in the list is selected according to a user command, the processor 120 may display a multi-view screen including the baseball content A and the baseball content B on the display 110.

Also, depending on embodiments, in a multi-view screen, at least one content provided by the first external device and at least one content provided by the second external device may be included. As an example, in a multi-view screen, the first and second baseball contents provided by the set-top box, and a third content provided by an IoT camera may be included.

Also, in the above, a multi-view screen related to exercise contents was described, but the disclosure can provide various multi-view screens related to various contents. Explanation in this regard will be described below with reference to FIG. 3.

Figure 3:
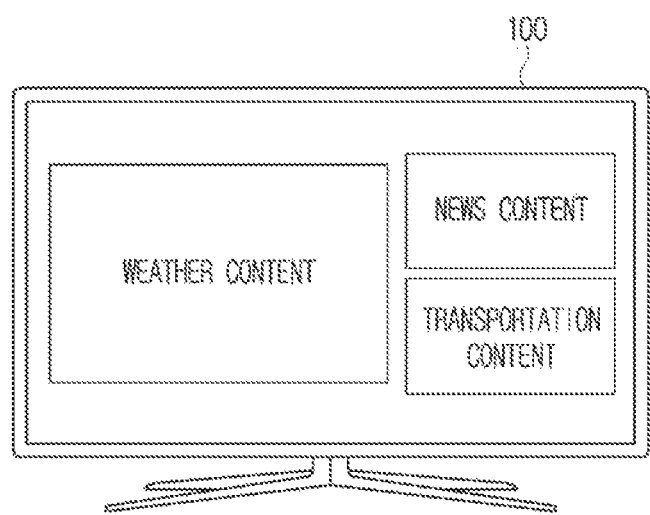
FIG. 3 is a diagram for illustrating a multi-view screen including a plurality of contents of an information provision type, according to an embodiment of the disclosure.

FIG. 3 is a diagram for illustrating a multi-view screen including a plurality of contents of an information provision type according to an embodiment of the disclosure.

If a multi-view execution command is input, the processor 120 may determine at least one content for constituting a multi-view screen based on the context in which the multi-view execution command was input.

As an example, if a multi-view execution command is input in a situation wherein a content providing information on the weather (referred to as a weather content hereinafter) is displayed on the display 110, the processor 120 may determine the type of the weather content as an information provision type based on the metadata of the weather content, and determine at least one other content of the information provision type.

Here, the weather content may be a content received from the first external device (e.g., an application server providing weather contents) through the first interface (e.g., a Wi-Fi communication interface).

Also, at least one other content of the information provision type may be a content received from the second external device (e.g., a set-top box) through the second interface (e.g., an HDMI) different from the first interface. As an example, the at least one other content of the information provision type may be a news content and/or a transportation content provided by the set-top box.

For this, the memory of the display device 100 may store information for a plurality of contents corresponding to a plurality of content types. As an example, the memory may store news contents and/or transportation contents as contents corresponding to contents of the information provision type.

When at least one content for constituting a multi-view screen is determined, the processor 120 may display a list including the determined at least one content on the display 110. As an example, if a multi-view execution command is input while a weather content is displayed on the display 110 as described above, the processor 120 may display a list including news contents and/or transportation contents on the display 110.

The processor 120 may receive a user command selecting one or a plurality of contents from the at least one content included in the list. As an example, the processor 120 may receive a user command selecting a news content and a transportation content included in the list. In this case, the processor 120 may execute an application for providing news contents and receive a first signal corresponding to a news content from a server providing news contents, and execute an application for providing transportation contents and receive a second signal corresponding to a transportation content from a server providing transportation contents.

Then, when a user command for finishing the constitution of the multi-view screen is input, the processor 120 may display a multi-view screen including a weather content, a news content based on the first signal, and a transportation content based on the second signal on the display 110 as in FIG. 3. Accordingly, the user can be provided with various kinds of information through the multi-view screen.

Figure 4:
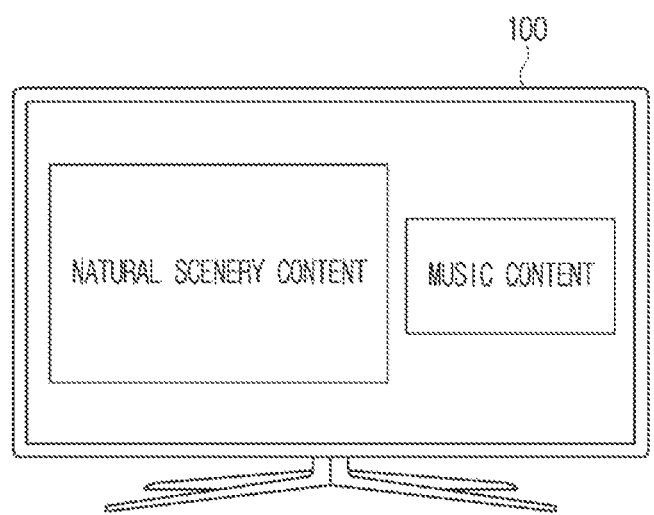
FIG. 4 is a diagram for illustrating a multi-view screen including a content not providing a sound and a content providing a sound, according to an embodiment of the disclosure.

FIG. 4 is a diagram for illustrating a multi-view screen including a content not providing a sound and a content providing a sound according to an embodiment of the disclosure.

If a multi-view execution command is input, the processor 120 may determine at least one content for constituting a multi-view screen based on the context in which the multi-view execution command was input.

As an example, if a multi-view execution command is input in a situation wherein a content without a sound is displayed on the display 110, the processor 120 may determine the content as a content of a type of providing an image without a sound based on the metadata of the content. Here, the content providing an image without a sound may be, for example, a still image such as an image of natural scenery, an image of an artist's artwork, an image for meditation, etc., but it may be a moving image depending on embodiments.

In this case, the processor 120 may determine at least one other content providing a sound. Here, the content providing a sound may be, for example, a music content provided from a music application server.

When at least one content for constituting the multi-view screen is determined, the processor 120 may display a list including the determined at least one content on the display 110. As an example, if a multi-view execution command is input while a natural scenery content is displayed on the display 110 as described above, the processor 120 may display a list including a music content on the display 110.

The processor 120 may receive a user command selecting one or a plurality of contents among at least one content included in the list. As an example, the processor 120 may receive a user command selecting a music content included in the list. In this case, the processor 120 may execute an application for providing music contents, and request provision of a music content to the server of the music application, and receive a signal corresponding to a music content from the server of the music application.

Then, when a user command for finishing the constitution of the multi-view screen is input, the processor 120 may display a multi-view screen including the natural scenery content and the music content based on the received signal on the display 110 as in FIG. 4. Accordingly, the user can appreciate natural scenery, and at the same time, appreciate music through the multi-view screen.

In the above, a music content was suggested as an example. However, this is merely an example, and in the disclosure, if a multi-view execution command is input while a content providing an image without a sound is displayed, a list including a meditation content may be displayed on the display 110.

Here, the content providing an image without a sound may be an image for meditation, and it may be, for example, a natural scenery image or an art image. Also, the meditation content may be a content provided by execution of a meditation application, and it may be, for example, a content guiding postures for meditation, etc.

Then, if a user command selecting the meditation content included in the list is received, the processor 120 may execute an application for providing meditation contents, and request provision of a meditation content to the server of the meditation application, and receive a signal corresponding to a meditation content from the server of the meditation application.

Then, the processor 120 may display a multi-view screen including the image for meditation such as natural scenery, etc. and a meditation content based on the received signal on the display 110. Accordingly, the user can appreciate natural scenery, etc., and at the same time, do meditation through the multi-view screen.

Figure 5:
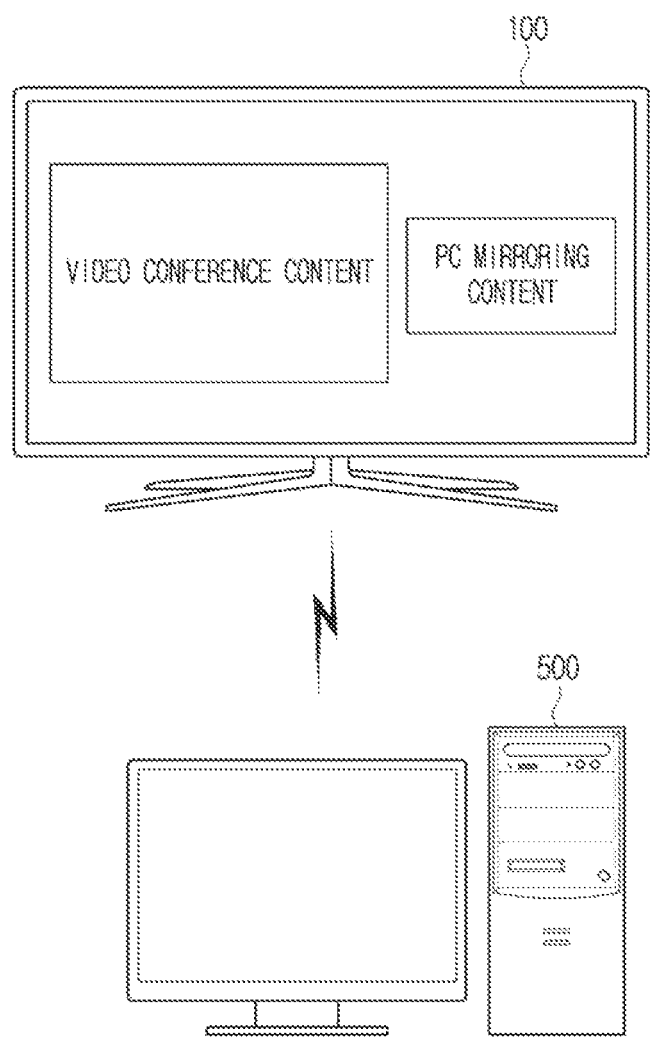
FIG. 5 is a diagram for illustrating a multi-view screen including a mirroring content received from an external device, according to an embodiment of the disclosure.

FIG. 5 is a diagram for illustrating a multi-view screen including a mirroring content received from an external device according to an embodiment of the disclosure.

If a multi-view execution command is input, the processor 120 may determine at least one content for constituting a multi-view screen based on the context in which the multi-view execution command was input.

As an example, if a multi-view execution command is input in a situation wherein a video conference program (or, a screen conference program or a teleconference program) was executed, or in a situation wherein a video conference content is displayed on the display 110 as a video conference program was executed, the processor 120 may determine the type of the content as a video conference type based on the metadata of the program that is being executed or the video conference content that is being displayed, and determine at least one other content of the video conference type.

As an example, at least one other content of the video conference type may be a mirroring content provided by an external device (e.g., a PC). Here, the mirroring content may be an image content provided through the monitor of the PC.

For this, the memory of the display device 100 may store information for a plurality of contents corresponding to a plurality of content types. As an example, the memory may store a mirroring content of the PC as a content corresponding to contents of the video conference type.

When at least one content for constituting the multi-view screen is determined, the processor 120 may display a list including the determined at least one content on the display 110. As an example, if a multi-view execution command is input while a video conference content is displayed on the display 110 as described above, the processor 120 may display a list including a mirroring content for mirroring the monitor screen of the PC 500 on the display 110.

The processor 120 may receive a user command selecting one or a plurality of contents among the at least one content included in the list. As an example, the processor 120 may receive a user command selecting a mirroring content included in the list. In this case, the processor 120 may request transmission of the mirroring content (e.g., an image content for mirroring) to the PC, and display a multi-view screen including the mirroring content in one area of the display 110 based on the mirroring content received from the PC. Here, the video conference content may be received from the first external device (e.g., a USB camera) through the first interface (e.g., a USB interface), and the mirroring content may be received from the second external device (e.g., a PC) through the second interface (e.g., a Wi-Fi interface).

Then, when a user command for finishing the constitution of the multi-view screen is input, the processor 120 may display a multi-view screen including the video conference content and the mirroring content that mirrored the monitor of the PC on the display 110 as in FIG. 5. Accordingly, the user can perform a video conference, etc. while checking out the conference materials, etc. through the mirrored PC screen.

In case a mirroring content is selected while communicative connection is not established with an external device, the processor 120 may provide guide information for mirroring. Specifically, if a mirroring content is selected while communicative connection is not established with an external device, the processor 120 may display a UI including a menu for communicative connection with an external device on the display 110, and perform communicative connection with an external device when a user command for communicative connection is received, and request transmission of an image content for mirroring to the external device which is communicatively connected.

Figure 6:
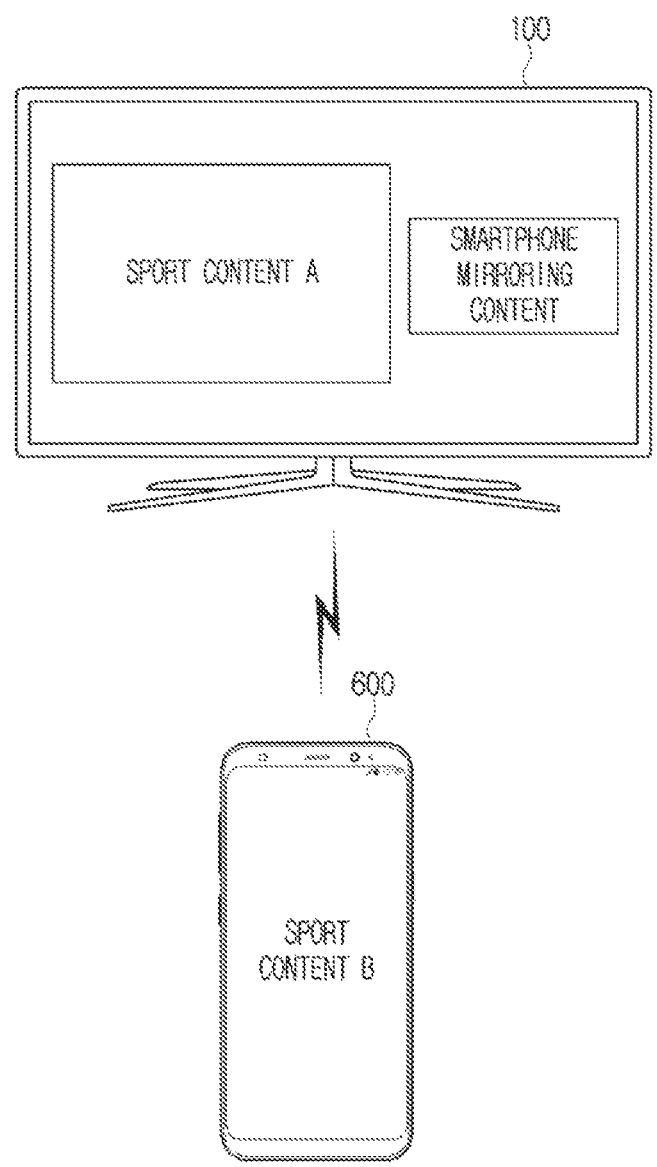
FIG. 6 is a diagram for illustrating a multi-view screen including a mirroring content received from a user terminal device, according to an embodiment of the disclosure.

FIG. 6 is a diagram for illustrating a multi-view screen including a mirroring content received from a user terminal device according to an embodiment of the disclosure.

If a multi-view execution command is input, the processor 120 may determine at least one content for constituting a multi-view screen based on the context in which the multi-view execution command was input.

As an example, if a multi-view execution command is input in a situation in which a sport content A provided by the set-top box is displayed on the display 110, the processor 120 may determine the type of the content as a sport type based on the metadata of the sport content A, and determine at least one other content of the sport type.

As an example, at least one other content of the sport type may be a mirroring content provided by a user terminal device (e.g., a smartphone). Here, the mirroring content is an image content provided through the display of the user terminal device, and as an example, the mirroring content may be an image content displayed by execution of a sport application.

For this, the memory of the display device 100 may store information for a plurality of contents corresponding to a plurality of content types. As an example, the memory may store a mirroring content of the user terminal device as a content corresponding to contents of the sport type.

When at least one content for constituting the multi-view screen is determined, the processor 120 may display a list including the determined at least one content on the display 110. As an example, if a multi-view execution command is input while a sport content A is displayed on the display 110 as described above, the processor 120 may display a list including a mirroring content for mirroring the screen of the user terminal device 600 on the display 110.

The processor 120 may receive a user command selecting one or a plurality of contents among at least one content included in the list. As an example, the processor 120 may receive a user command selecting a mirroring content included in the list. In this case, the processor 120 may request transmission of a mirroring content to the user terminal device, and display a multi-view screen including the mirroring content in one area of the display 110 based on the mirroring content received from the user terminal device.

Then, when a user command for finishing the constitution of the multi-view screen is input, the processor 120 may display a multi-view screen including the sport content A and the mirroring content that mirrored the screen of the user terminal device on the display 110 as in FIG. 6. Accordingly, the user can view the mirroring content (e.g., an image content for the baseball game B) together with the sport content A (e.g., an image content for the baseball game A).

Figure 7:
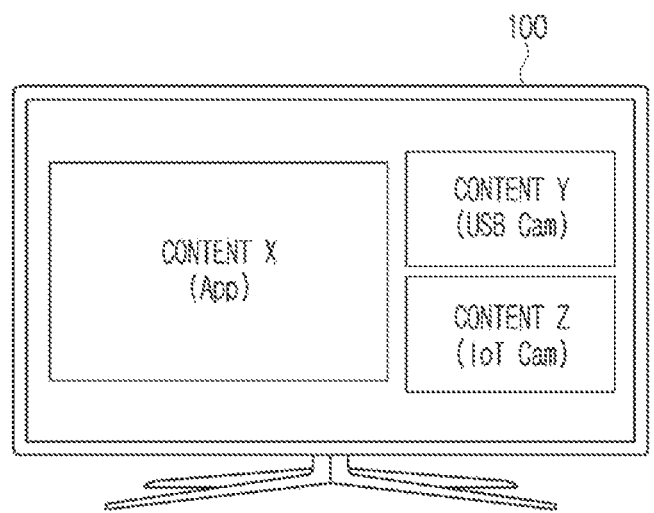
FIG. 7 is a diagram for illustrating an embodiment of displaying a multi-view screen based on content use history information, according to an embodiment of the disclosure.

FIG. 7 is a diagram for illustrating an embodiment of displaying a multi-view screen based on content use history information according to an embodiment of the disclosure.

If a multi-view execution command is input, the processor 120 may determine at least one content for constituting a multi-view screen based on the context in which the multi-view execution command was input.

Here, the context may be a time context when the multi-view execution command was input. Specifically, if a multi-view execution command is input, the processor 120 may determine the time when the multi-view execution command was input, and determine at least one content corresponding to the time when the multi-view execution command was input based on content use history information.

For this, the memory of the display device 100 may store content use history information. Here, the content use history information may include information for contents provided in advance for each time (or, for each time section).

As an example, if the time when a multi-view execution command was input is 8 p.m., the processor 120 may determine at least one content provided in advance through the multi-view screen at 8 p.m. in the past based on the content use history information. Then, as an example, in case the contents determined based on the content use history information are a content X provided by the server of an exercise application, a content Y provided by the USB camera, and a content Y provided by the IoT camera, the processor 120 may display a list including the content X, the content Y, and the content Z. Then, if a user command selecting the content X is received, the processor 120 may transmit a signal requesting transmission of the context X to the sever of the exercise application, and receive a signal corresponding to the content X from the sever of the exercise application. Also, if a user command selecting the content Y is received, the processor 120 may execute an application for control of the USB camera, and receive a signal corresponding to the content Y photographed by the USB camera from the USB camera, and if a user command selecting the content Z is received, the processor 120 may execute an application for control of the IoT camera, and receive a signal corresponding to the content Z photographed by the IoT camera from the IoT camera. Here, the IoT camera may be located, for example, in a different place from the place wherein the display device 100 is installed (e.g., located in the baby's room), but the disclosure is not necessarily limited thereto.

Afterwards, when a user command for finishing the constitution of the multi-view screen is input, the processor 120 may display a multi-view screen including the content X, the content Y, and the content Z through the display 110 based on the received signal, as illustrated in FIG. 7.

Accordingly, the user can be provided with a multi-view screen including a plurality of contents that the user often viewed in specific time zones quickly.

Figure 8:
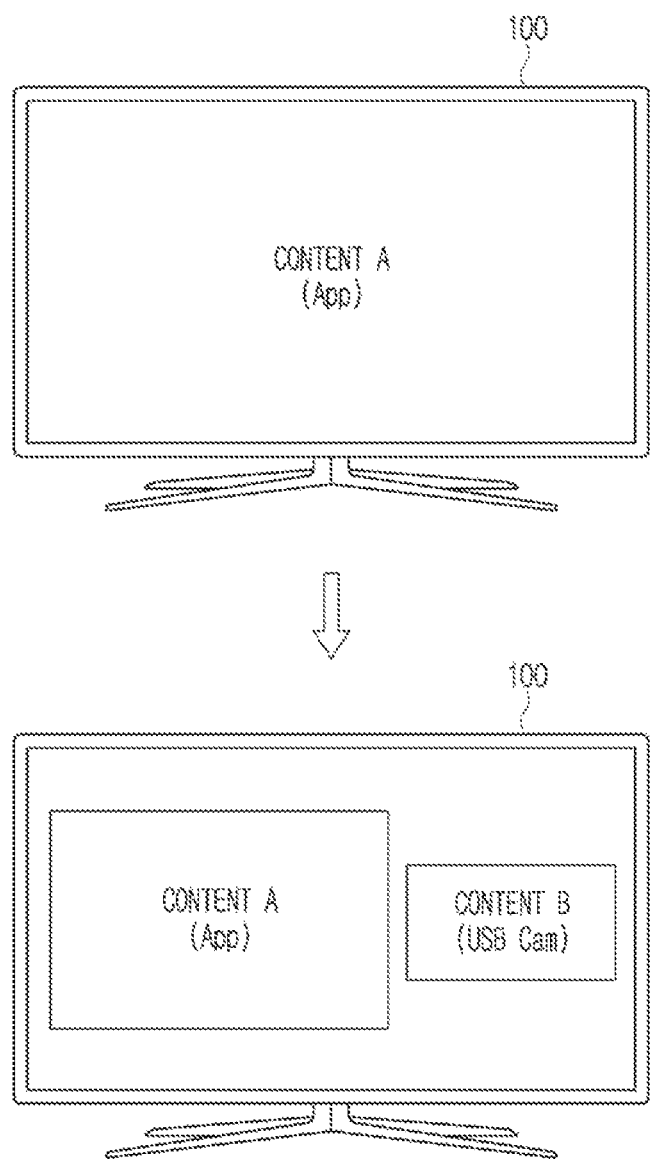
FIG. 8 is a diagram for illustrating an embodiment of displaying a multi-view screen, according to an embodiment of the disclosure.

FIG. 8 is a diagram for illustrating an embodiment of displaying a multi-view screen according to an embodiment of the disclosure.

In the above, an embodiment wherein at least one list for constituting a multi-view screen is displayed, and a multi-view screen including at least one content selected in the list is displayed was described.

However, this is merely an example, and if a multi-view execution command is input, the processor 120 may also display a multi-view screen including a plurality of contents directly.

Specifically, if a multi-view execution command is input, the processor 120 may determine at least one content for constituting a multi-view screen based on the context in which the multi-view execution command was input, and display a multi-view screen including the determined at least one content directly without displaying a list.

As an example, as illustrated in FIG. 8, if a multi-view execution command is input while the content A of the exercise type is displayed on the display 110, the processor 120 may display a multi-view screen including the content B provided by the USB camera.

Accordingly, the user can be provided with a multi-view screen that fits the situation in which the multi-view execution command was input quickly.

Figure 9:
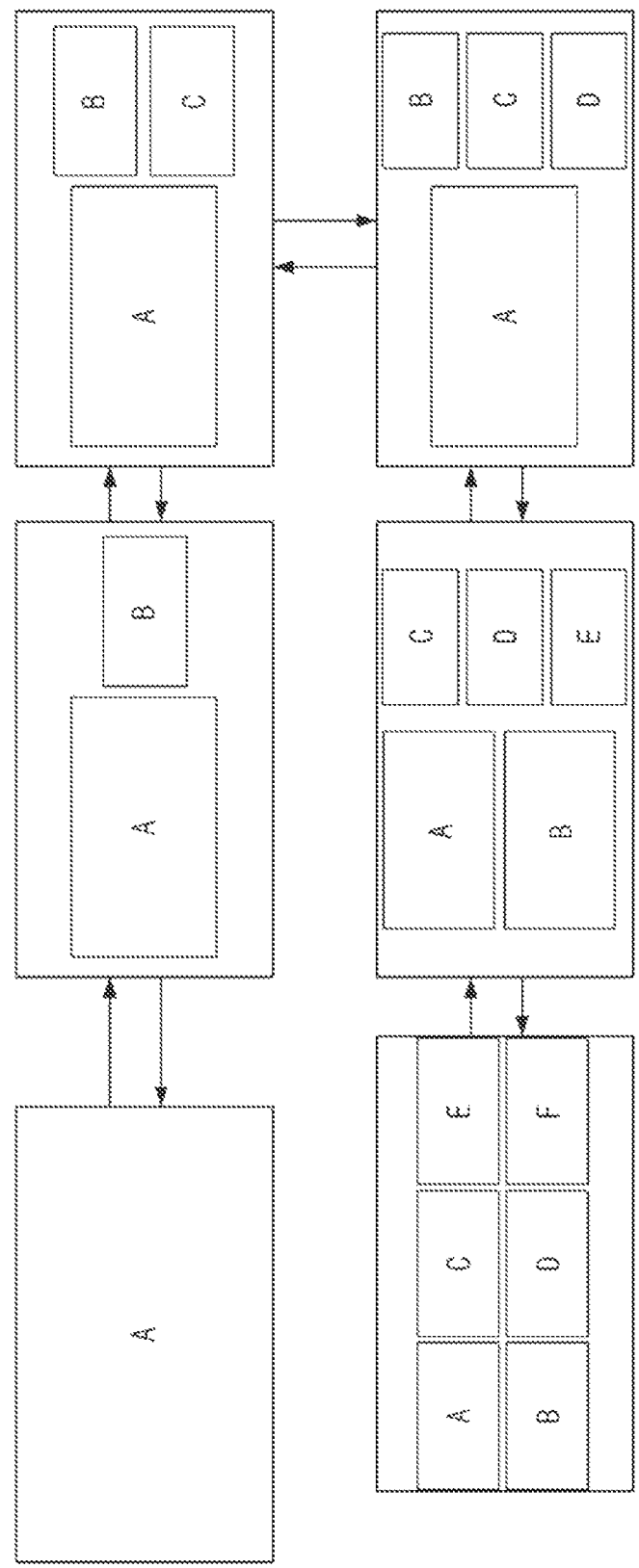
FIG. 9 is a diagram for illustrating constitution of a multi-view screen, according to an embodiment of the disclosure.

FIG. 9 is a diagram for illustrating constitution of a multi-view screen according to an embodiment of the disclosure.

The processor 120 may change at least one of the size or the display area of each content based on the number of the contents constituting the multi-view screen.

As an example, referring to FIG. 9, if a user command for adding the content B is input while the content A is displayed, the processor 120 may change the size and the display area of the content A, and display a multi-view screen including the content B. Afterwards, if a user command for adding the content C is input, the processor 120 may change the display area of the content B, and display a multi-view screen further including the content C. Then, if a user command for adding the content D is input, the processor 120 may change the display areas of the content B and the content C, and display a multi-view screen further including the content D. Then, if a user command for adding the content E is input, the processor 120 may change the sizes and the display areas of the content A and the content B, and change the display areas of the content C and the content D, and display a multi-view screen further including the content E. Then, if a user command for adding the content F is input, the processor 120 may change the sizes and the display areas of the content A, the content B, the content C, the content D, and the content E, and display a multi-view screen further including the content F.

Also, in case a user command for deleting contents constituting a multi-view screen is input on the contrary, the processor 120 may change at least one of the sizes or the display areas of the plurality of contents constituting the multi-view screen in a similar manner to the aforementioned technical idea.

The constitution of the multi-view screen as above is merely an example, and the constitution of the multi-view screen may vary depending on embodiments. For example, the processor 120 may adjust the display areas and the sizes of a plurality of contents so that areas wherein contents are not displayed become minimum on the multi-view screen. As an example, in case four contents are included in a multi-view screen, the processor 120 may divide the screen in four parts and display a first content in the left upper end area, display a second content in the right upper end area, display a third content in the left lower end area, and display a fourth content in the right lower end area.

Figure 10A:
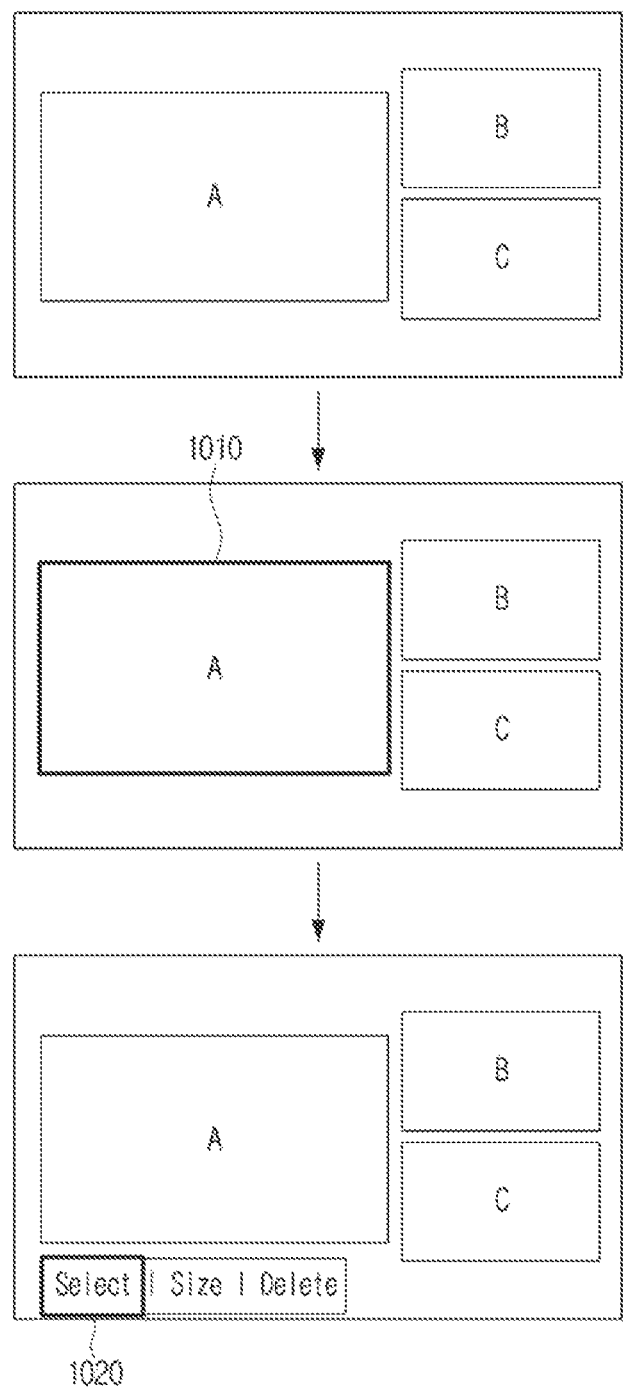
FIG. 10A is a diagram for illustrating an embodiment of selecting one of a plurality of contents included in a multi-view screen, according to an embodiment of the disclosure.

FIG. 10A is a diagram for illustrating an embodiment of selecting one of a plurality of contents included in a multi-view screen according to an embodiment of the disclosure, and FIG. 10B is a diagram for illustrating a screen for controlling one of a plurality of contents included in a multi-view screen according to an embodiment of the disclosure.

The processor 120 may receive a user command for selecting one of a plurality of contents included in a multi-view screen.

Here, the user command may be a user command for pushing a direction key button and a check button provided on the remote control device 200. In case a direction key button provided on the remote control device 200 is selected, the processor 120 may display an indicator 1010 on one (e.g., the content A) of the plurality of contents constituting the multi-view screen as illustrated in FIG. 10A, based on the signal received from the remote control device 200. Then, in case the check button provided on the remote control device 200 is pushed afterwards, the processor 120 may display a menu related to control of the content A on which the indicator is displayed based on the signal received from the remote control device 200. Here, in the menu, a first sub menu for selection of a content, a second sub menu for adjustment of the size of a content, a third sub menu for deletion of a content, etc. may be included.

Then, the processor 120 may receive a user command for selecting the first sub menu for selection of a content among the plurality of sub menus. As an example, in case a directly key button provided on the remote control device 200 is selected while the content A is selected, the processor 120 may display an indicator 1020 on one (e.g., the first sub menu for selection of a content) of the plurality of sub menus based on the signal received from the remote control device 200. Then, in case the check button provided on the remote control device 200 is pushed afterwards, the processor 120 may display a screen for control of the content A.

Meanwhile, a user command for selection of a content or selection of a sub menu may be a user voice input through the microphone provided on the remote control device 200 or the display device 100, or it may be a user gesture input into the sensor (e.g., a camera, etc.) of the display device 100. Also, the user command may be received by manipulation of a switch (e.g., a jog switch) provided on the display device 100 or a user input of touching the display 110 implemented as a touch screen.

Referring to FIG. 10B, if the first sub menu for selection of a content is selected, the processor 120 may adjust the size of the multi-view screen and display the screen in the first area 1030 of the screen, and display a screen for control of the selected content A in the second area 1040 of the screen. Then, when a command for control of the content A is received through the remote control device or a user voice, etc., the processor 120 may control the content A according to the user command. Here, the user command may be, for example, change of the volume of the content A, the brightness of the screen, the channel, etc.

Meanwhile, as illustrated in FIG. 10B, the screen for control of the content A may further include a UI 1050 indicating information on the source providing the content A, and guide information 1060 for returning to the previous screen. Also, in the first area 1030, a UI 1031 indicating that the content A among the plurality of contents included in the multi-view screen is the subject for control may be included.

As described above, in the disclosure, a multi-view screen of which size was adjusted and a screen for control of a content are displayed together, and accordingly, a user can perform control of the content A while viewing a plurality of contents through the multi-view screen.

Figure 11:
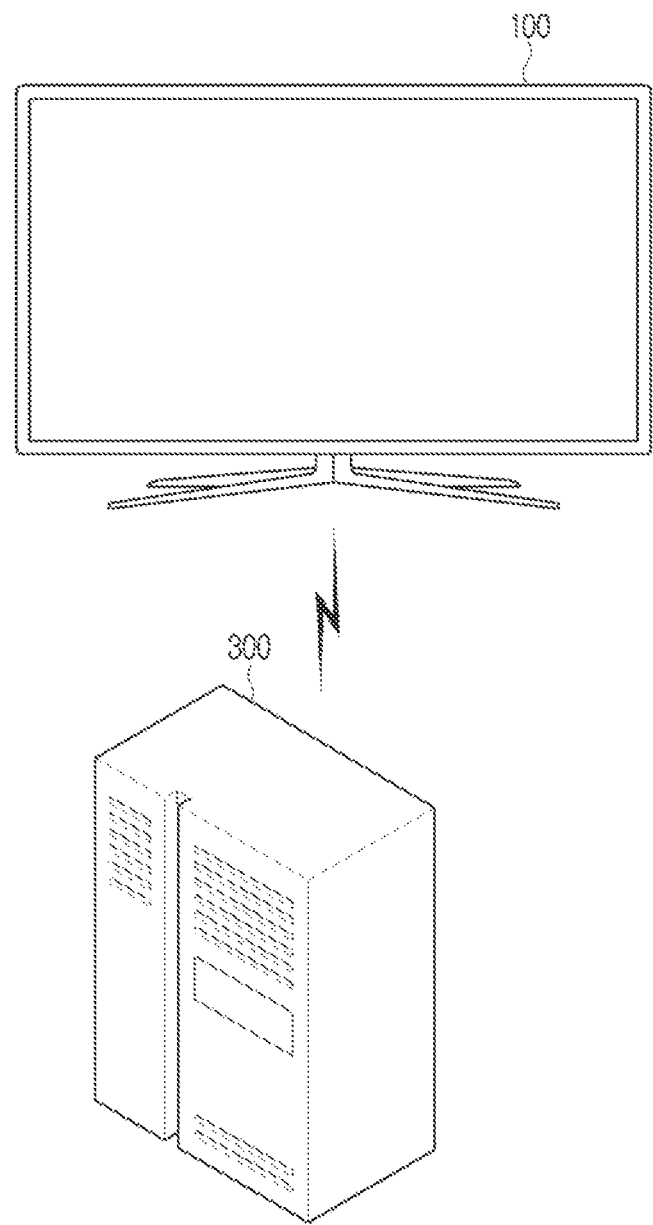
FIG. 11 is a diagram for illustrating an embodiment of providing a multi-view screen based on communication with a server, according to an embodiment of the disclosure.

FIG. 11 is a diagram for illustrating an embodiment of providing a multi-view screen based on communication with a server according to an embodiment of the disclosure.

The processor 120 may receive information for contents for constituting a multi-view screen through communication with the server 300.

For this, the server 300 may store at least one of information for a plurality of contents corresponding to a plurality of content types or content use history information. Here, the content use history information may include information for contents provided by the display device 100 for each time.

If a multi-view execution command is input, the processor 120 may request transmission of information for at least one content for constituting a multi-view screen to the server 300. In this case, the server 300 may determine at least one content for constituting a multi-view screen based on the context in which the multi-view execution command was input (or, the context in which transmission of information was requested). For this, the server 300 may receive information for the content (e.g., the content A) that is being displayed on the display 110 from the display device 100. Alternatively, in case the server 300 provides the content A, the server 300 may determine at least one content for constituting the multi-view screen based on the content A that is being provided.

Also, the server 300 may determine at least one content for constituting the multi-view screen based on at least one of the type of the content that is being displayed through the display device 100 or the content use history information, and transmit information for the determined at least one content to the display device 100.

Then, based on the information received from the server 300, the display device 100 may display a list displaying at least one content for constituting the multi-view screen, and display the multi-view screen based on a user command for selecting one or a plurality of contents included in the list.

Figure 12:
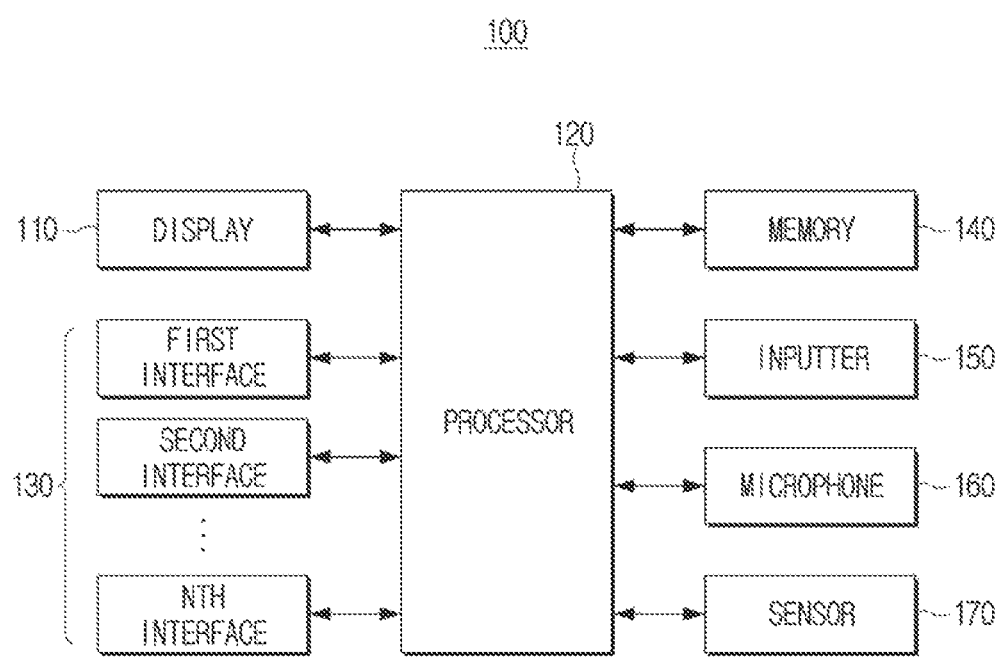
FIG. 12 is a block diagram for illustrating a display device, according to an embodiment of the disclosure.

FIG. 12 is a block diagram for illustrating a display device according to an embodiment of the disclosure.

Referring to FIG. 12, the display device 100 according to an embodiment of the disclosure may include a display 110, a plurality of interfaces 130, a memory 140, an inputter 150, a microphone 160, a sensor 170, and a processor 120. Hereinafter, parts overlapping with the aforementioned explanation will be omitted or explained in an abridged form.

The display device 100 may include a plurality of interfaces 130. Here, the plurality of interfaces 130 may include a wired communication interface and a wireless communication interface.

As an example, the wired communication interface (or, a wired communication module) may be a tuner, a universal serial bus (USB), an RS-232 interface, an Ethernet interface, etc., and the wired communication interface may be connected with various external devices and receive various contents.

Also, the wireless communication interface (or, a wired communication module) may be, for example, an interface for Wi-Fi communication, an interface for Bluetooth communication, an interface for Internet communication, etc., and the wireless communication interface may be connected with various external devices through a network, and receive various contents.

In addition, the wireless communication interface may be a mobile communication interface that performs communication by accessing a mobile communication network according to various mobile communication protocols such as 3rd Generation (3G), 3rd Generation Partnership Project (3GPP), Long Term Evolution (LTE), 5th Generation (5G), and the like.

The memory 140 may store an operating system (OS) for controlling the overall operations of the components of the display device 100, and commands or data related to the components of the display device 100.

Accordingly, the processor 120 may control a plurality of hardware or software components of the display device 100 by using the various commands or data stored in the memory 140, and load commands or data received from at least one of the other components on a volatile memory and process them, and store various kinds of data in a non-volatile memory.

In particular, the memory 140 may store information for a plurality of contents corresponding to a plurality of content types. As an example, the memory may store contents provided by the USB camera as contents corresponding to contents of the exercise type. Also, the memory 140 may store the content use history information. Here, the content use history information may include information for contents provided in advance through the display device 100 for each time (or, for each time section). As an example, the memory 140 may store information for a plurality of contents included in a multi-view screen provided in advance in specific times.

The inputter 150 may receive a user command. For example, the inputter 150 may include a button, a jog switch, or a touch screen. Also, the inputter 150 may include an IR receiver for receiving IR signals transmitted from the remote control device, or include a Bluetooth module, a Wi-Fi communication module, etc. for receiving control signals transmitted from the remote control device.

The microphone 160 may receive a user voice. Here, the user voice may be a voice for executing a specific function of the display device 100. When a user voice is received through the microphone 160, the processor 120 may analyze the user voice through a speech to text (STT) algorithm, and perform a function corresponding to the user voice.

The sensor 170 may detect user gestures. For this, the sensor 170 may be implemented as a camera, an infrared sensor, etc.

The processor 120 may perform execution of the multi-view function, display of a multi-view screen, deletion of at least one content among a plurality of contents constituting a multi-view screen, etc. based on a user command received through the inputter 150, a user voice received through the microphone 160, or a user gesture detected by the sensor 170.

Meanwhile, the components in FIG. 12 are merely an example, and the display device 100 may further include various components. As an example, the display device 100 may further include a signal processor for processing content signals. The signal processor may perform operations such as decoding, scaling, and frame rate conversion, etc. of image data included in a content signal, and process a content corresponding to the content signal as a form that can be output through the display 110. Also, the signal processor may perform decoding of audio data included in a content signal, and process the audio data as a form that can be output through the speaker (not shown).

Figure 13:
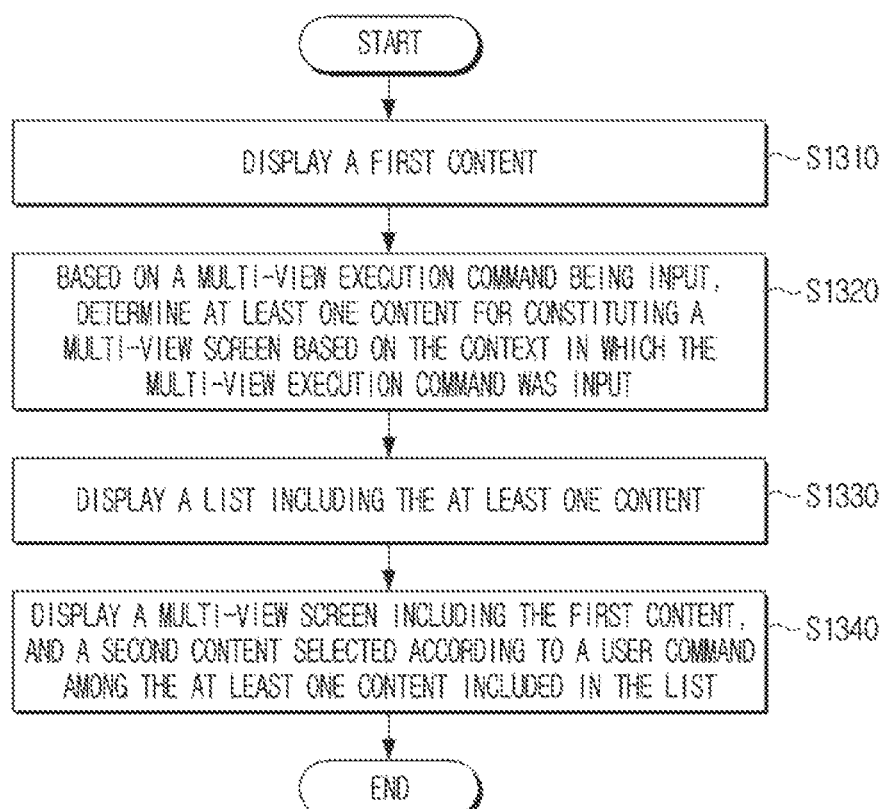
FIG. 13 is a flow chart for illustrating a method of displaying a multi-view screen, according to an embodiment of the disclosure.

FIG. 13 is a flow chart for illustrating a method of displaying a multi-view screen according to an embodiment of the disclosure.

The display device 100 may display (S1310) a first content. Here, the first content may be a content received from the first external device through the first interface. As an example, the first content may be a home training content received from the server of an exercise application through a Wi-Fi interface.

If a multi-view execution command is input, the display device 100 may determine (S1320) at least one content for constituting a multi-view screen based on the context in which the multi-view execution command was input. Specifically, the display device 100 may determine at least one content for constituting the multi-view screen based on the type of the content that is being displayed. For this, the display device 100 may determine the type of the content based on the metadata of the content. Then, the display device 100 may determine at least one content corresponding to the type of the content that is being displayed. For this, the display device 100 may store information for a plurality of contents corresponding to a plurality of content types.

The display device 100 may display (S1330) a list including at least one content for constituting the multi-view screen. As an example, if a multi-view execution command is input while the first content of the exercise type received from a first external device (e.g., a set-top box) through a first external interface (e.g., an HDMI) is displayed on the display 110, the display device 100 may display a list including a second content provided by a second external device (e.g., a USB camera) through a second interface (e.g., a USB interface) on the display 110.

The display device 100 may display (S1340) a multi-view screen including the first content, and the second content selected according to a user command among the at least one content included in the list.

As described above, in the disclosure, a plurality of contents provided by various source devices can be provided through a multi-view screen. Also, by providing recommended contents and/or a combination of recommended contents for constituting a multi-view screen to a user based on a context in which a multi-view function was executed, a multi-view screen that fits the user need can be provided quickly.

Meanwhile, methods according to the aforementioned various embodiments of the disclosure may be implemented in the form of software or an application that can be installed on conventional display devices.

Also, the methods according to the aforementioned various embodiments of the disclosure may be implemented just with software upgrade, or hardware upgrade of conventional display devices.

In addition, the aforementioned various embodiments of the disclosure can be performed through an embedded server provided on a display device, or an external server of a display device.

A non-transitory computer readable medium storing a program that performs the control method of a display device according to the disclosure sequentially can be provided.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:
   a display; and
   at least one processor configured to:
      control the display to display a first content on the display,
      based on a multi-view execution command being input, determine at least one content for providing a multi-view screen based on a context in which the multi-view execution command was input,
      control the display to display a list including the at least one content on the display, and
      control the display to display the multi-view screen including the first content, and a second content, selected according to a user command, among the at least one content included in the list on the display,
   wherein the first content is provided by a first external device connected through a first interface, and
   wherein the second content is provided by a second external device connected through a second interface that is different from the first interface,
   wherein the at least one processor is further configured to:
      based on the multi-view execution command being input, determine a type of the first content that is being displayed through the display;
      control the display to, based on the type of the first content being a content of a first type, display the list including the second content of the first type on the display; and
      based on the second content of the first type included in the list being selected according to the user command, execute an application for providing the second content, receive a signal corresponding to the second content from the second external device based on the execution of the application, and control the display to display the multi-view screen including the second content based on the received signal.

2. The display device of claim 1, wherein the at least one processor is further configured to:
   determine the at least one content for providing the multi-view screen based on the type of the first content.

3. The display device of claim 2, wherein the at least one processor is further configured to:
   control the display to, based on the first content being a content of an exercise type, display the list including the second content of the exercise type on the display, and
   based on the second content of the exercise type included in the list being selected according to the user command, execute an application for providing the second content, receive a signal corresponding to the second content from the second external device based on the execution of the application, and control the display to display the multi-view screen including the second content based on the received signal.

4. The display device of claim 2, wherein the at least one processor is further configured to:
   based on the first content being a content of an information provision type, control the display to display the list including the second content of the information provision type on the display, and
   based on the second content included in the list being selected according to the user command, execute an application for providing the second content, receive a signal corresponding to the second content from the second external device based on the execution of the application, and control the display to display the multi-view screen including the second content providing different information from the first content on the display based on the received signal.

5. The display device of claim 2, wherein the at least one processor is further configured to:
   based on the first content being a content of a type of providing an image without a sound, control the display to display the list including the second content providing a sound on the display, and
   based on the second content included in the list being selected according to the user command, execute an application for providing the second content, receive a signal corresponding to the second content from the second external device based on the execution of the application, and control the display to display the multi-view screen including the second content providing a sound on the display based on the received signal.

6. The display device of claim 1, wherein the at least one processor is further configured to:
   based on a user command for selecting a mirroring content among the at least one content included in the list, receive image data for mirroring from the second external device through the second interface, and control the display to display the multi-view screen including a content that is being displayed on the second external device on the display based on the image data.

7. The display device of claim 1, wherein the at least one processor is further configured to:
   based on the multi-view execution command being input, determine the second content provided at a time when the multi-view execution command was input based on content use history information, and control the display to display the list including the second content on the display.

8. The display device of claim 1, wherein the second content includes an image provided through a camera connected to the second interface.

9. The display device of claim 1, wherein the at least one processor is further configured to:
   based on a user command for selecting a content among a plurality of contents included in the multi-view screen, control the display to display the plurality of contents in a first area, control the display to display a screen for control of the content selected according to the user command in a second area, and perform control of the selected content based on a user command input into the second area.

10. The display device of claim 1, wherein the at least one processor is further configured to:
    based on the context in which the multi-view execution command was input, determine a plurality of contents for providing the multi-view screen, control the display to display the list including a user interface (UI)

corresponding to a combination of the plurality of contents, and control the display to display the multi-view screen including the plurality of contents on the display based on a user command selecting the UI.

11. A control method of a display device, the control method comprising:
    displaying a first content on a display of the display device;
    based on a multi-view execution command being input, determining at least one content for providing a multi-view screen based on a context in which the multi-view execution command was input;
    displaying, on the display, a list including the at least one content; and
    displaying, on the display, a the multi-view screen including the first content, and a second content, selected according to a user command, among the at least one content included in the list,
    wherein the first content is provided by a first external device connected through a first interface, and
    wherein the second content is provided by a second external device connected through a second interface that is different from the first interface,
    wherein the control method further comprises:
        based on the multi-view execution command being input, determining a type of the first content that is being displayed through the display;
        control the display to, based on the type of the first content being a content of a first type, displaying the list including the second content of the first type on the display; and
        based on the second content of the first type included in the list being selected according to the user command, executing an application for providing the second content, receiving a signal corresponding to the second content from the second external device based on the execution of the application, and controlling the display to display the multi-view screen including the second content based on the received signal.

12. The control method of a display device of claim 11, wherein the determining the at least one content comprises:
    determining the at least one content for providing the multi-view screen based on the type of the first content.

13. The control method of a display device of claim 12, wherein the displaying the list comprises:
    based on the first content being a content of an exercise type, displaying the list including the second content of the exercise type, and
    wherein the displaying the multi-view screen comprises:
    based on the second content of the exercise type included in the list being selected according to the user command, executing an application for providing the second content, receiving a signal corresponding to the second content from the second external device based on the execution of the application, and displaying the multi-view screen including the second content based on the received signal.

14. The control method of a display device of claim 12, wherein the controlling to display the list comprises:
    based on the first content being a content of an information provision type, controlling to display the list including the second content of the information provision type, and
    wherein the controlling to display the multi-view screen comprises:
        based on the second content included in the list being selected according to the user command, executing an application for providing the second content, receiving a signal corresponding to the second content from the second external device based on execution of the application, and controlling to display the multi-view screen including the second content providing different information from the first content based on the received signal.

15. The control method of a display device of claim 12, wherein the controlling to display the list comprises:
    controlling to display, based on the first content being a content of a type of providing an image without a sound, the list including the second content providing a sound, and
    wherein the controlling to display the multi-view screen comprises:
        based on the second content included in the list being selected according to the user command, executing an application for providing the second content, receiving a signal corresponding to the second content from the second external device based on execution of the application, and controlling to display the multi-view screen including the second content providing a sound based on the received signal.

16. The control method of a display device of claim 11, wherein the displaying the multi-view screen comprises:
    based on a user command for selecting a mirroring content among the at least one content included in the list, receiving image data for mirroring from the second external device through the second interface, and displaying the multi-view screen including a content that is being displayed on the second external device on the display based on the image data.

17. The control method of a display device of claim 11, wherein the controlling to display the list comprises:
    based on the multi-view execution command being input, determining the second content provided at a time when the multi-view execution command was input based on content use history information, and displaying the list including the second content on the display.

18. The control method of a display device of claim 11, wherein the second content includes an image provided through a camera connected to the second interface.

19. The control method of a display device of claim 11, wherein the displaying the multi-view screen comprises:
    based on a user command for selecting a content among a plurality of contents included in the multi-view screen, displaying the plurality of contents in a first area, displaying a screen for control of the content selected according to the user command in a second area, and performing control of the selected content based on a user command input into the second area.

20. A non-transitory computer readable recording medium storing computer instructions that cause a display device to perform an operation when executed by a processor of an electronic apparatus, wherein the operation comprises:
    displaying a first content on a display of the display device;
    based on a multi-view execution command being input, determining at least one content for providing a multi-view screen based on a context in which the multi-view execution command was input;
    displaying, on the display, a list including the at least one content; and
    displaying, on the display, a the multi-view screen including the first content, and a second content, selected according to a user command, among the at least one content included in the list, wherein the first content is provided by a first external device connected through a first interface, wherein the second content is provided by a second external device connected through a second interface that is different from the first interface, and wherein the operation further comprises:
- based on the multi-view execution command being input, determining a type of the first content that is being displayed through the display;
- control the display to, based on the type of the first content being a content of a first type, displaying the list including the second content of the first type on the display; and
- based on the second content of the first type included in the list being selected according to the user command, executing an application for providing the second content, receiving a signal corresponding to the second content from the second external device based on the execution of the application, and controlling the display to display the multi-view screen including the second content based on the received signal.

* * * * *